United States Patent [19]

Kratt

[11] 4,196,985
[45] Apr. 8, 1980

[54] FRAME-COUNTING DEVICE FOR USE WITH FILM CASSETTE

[75] Inventor: Kurt Kratt, Aldingen, Fed. Rep. of Germany

[73] Assignee: J. Hengstler K.G., Aldingen, Fed. Rep. of Germany

[21] Appl. No.: 912,389

[22] Filed: Jun. 5, 1978

[30] Foreign Application Priority Data

Jun. 8, 1977 [DE] Fed. Rep. of Germany ....... 2725876

[51] Int. Cl.² .............................................. G03B 1/60
[52] U.S. Cl. ..................................... 352/172; 352/72; 352/91 R; 352/129
[58] Field of Search ................. 352/91 R, 91 C, 91 S, 352/129, 172, 72; 354/212, 215, 217

[56] References Cited

U.S. PATENT DOCUMENTS

| | | | |
|---|---|---|---|
| 1,964,879 | 7/1934 | Jelinek | 352/129 |
| 1,999,133 | 4/1935 | Shapiro | 352/129 |
| 2,365,690 | 12/1944 | Fassin | 354/212 |
| 2,701,507 | 2/1955 | Bergenhoff | 354/212 |
| 3,425,776 | 2/1969 | Mayr et al. | 352/91 S |
| 3,656,843 | 4/1972 | Misch | 352/129 |
| 3,706,439 | 12/1972 | Skinner et al. | 352/129 |
| 3,945,719 | 3/1976 | Iida | 352/91 C |

*Primary Examiner*—Monroe H. Hayes

[57] ABSTRACT

The frame-counting device is primarily intended for use with a film cassette in titling and lap dissolve operations. The film cassette contains an unexposed film having a series of perforations and is of the type having a side wall formed with an opening which defines a film plane and through which the film is exposed. The device includes the following structure: a housing having an aperture for receiving the film cassette with its open side wall ahead, a transport sprocket which is rotatably mounted in the housing and engageable with the perforations of the unexposed film of the cassette received in the aperture of the housing, and a member for shielding the film plane of the cassette as received in the aperture against an access of light. A counter is carried by the housing, which counter is readable from the outside and operatively connected inside the housing to the transport sprocket. In addition, the device is provided with a single frame stepping mechanism, including a stepping wheel operable by a push button to actuate the counter. The stepping mechanism is adapted to be connected to a flexible wire release for use with a motion picture camera for operating the camera for single exposures.

19 Claims, 5 Drawing Figures

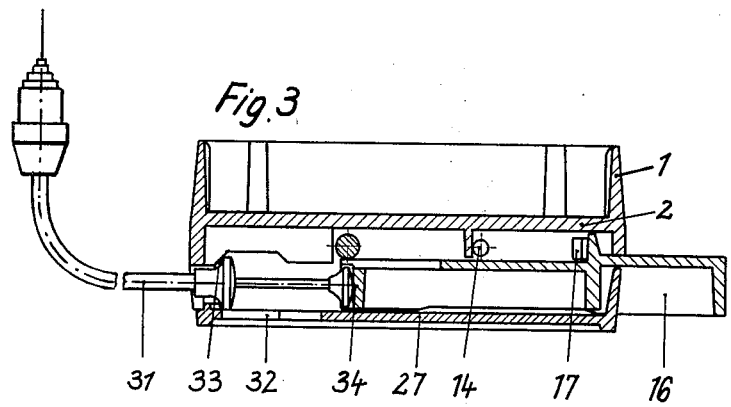
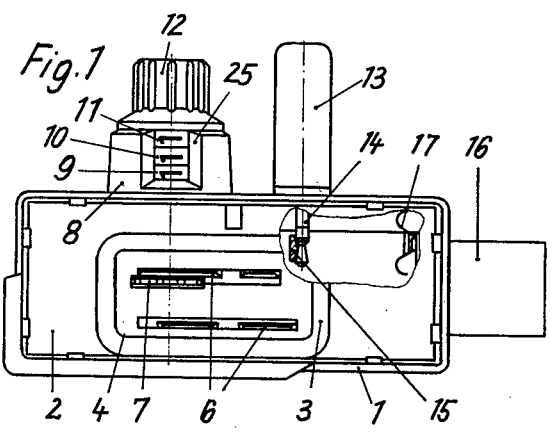
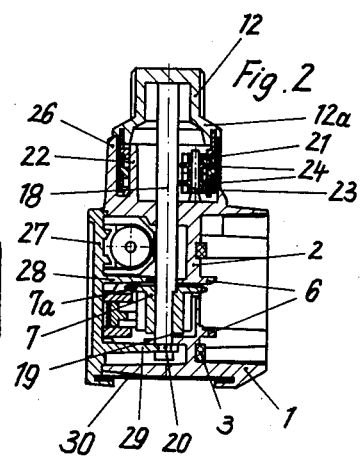
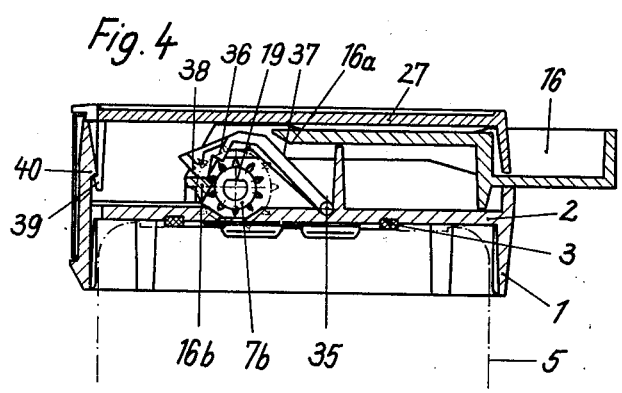
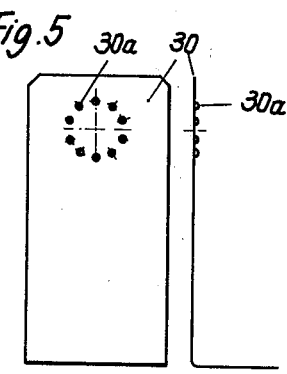

FRAME-COUNTING DEVICE FOR USE WITH FILM CASSETTE

This invention relates to a frame-counting device for film cassettes, particularly to a lap dissolve counting device for super 8 motion picture equipment.

It is known to provide motion picture cameras with built-in frame counters, which indicate to the operator the film length which has been exposed or the film length which is still available for exposure. These frame counters comprise a pointer which moves over a scale to indicate the film length which has been exposed or the film length which is still available. It is also known to provide viewers and projectors with built-in frame counters for counting individual frames. These frame counters comprise a pointer, which moves over a scale to indicate the film length which has been exposed or the film length which is still available. It is also known to provide viewers and projectors with built-in frame counters for counting individual frames. These frame counters may also be used to ascertain the number of frames used for a scene. The counters which have been described last can be used only in conjunction with the appliances themselves and only with developed films.

It is an object of the invention to provide a frame-counting device for use with film cassettes, which device enables during titling and lap dissolve operations an exact counting of the frames of unexposed film for a scene to be shot first and then enables the film to be returned exactly to its initial position when the cassette is inserted in the lighttight cassette holder. The film cassette is then loaded back into the motion picture camera and is exposed for a lap dissolved in a second shot having a scene length corresponding to the number of frames which has been initially ascertained by the counting device.

In a frame counting device for film cassettes, particularly a lap dissolve counting device for super 8 motion picture appliances, this object is accomplished by having a housing of plastic material, which is open on one side and serves to receive a film cassette with its film gate side ahead and in such a manner that the perforations of the film are engaged by a transport sprocket and the film plane is lighttightly shielded, and said transport sprocket is connected to a counter, which is disposed in the housing and readable from the outside. The assembly consisting of the counter and transport sprocket is provided with an actuating knob and is also provided with a single-frame stepping mechanism comprising a stepping wheel operable by a pushbutton to actuate the counter. The stepping mechanism is adapted to be connected to a conventional flexible wire or cable release for operating the camera for single exposures. One end of conventional wire release is inserted into the housing of the device (to be operated by the pushbutton), and the other end (free end) is adapted to be conventionally attached to a movie camera shutter to operate the same.

Further details of the frame-counting device according to the invention for film cassettes will now be described with reference to a preferred embodiment, which is diagrammatically shown on the drawing, in which FIG. 1 is a top plan view showing a lap dissolve counting device, FIG. 2 is a transverse sectional view showing the counter and its drive means, FIG. 3 is a longitudinal sectional view showing the pushbutton and the flexible wire release, FIG. 4 is a longitudinal sectional view showing the pushbutton and the stepping wheel and FIG. 5 is an end elevation and side elevation showing the associated member for locking the winding core.

FIG. 1 shows a housing 1 of plastic material. The housing is integrally formed with a horizontal partition 2 and is provided with a gasket 3, which surrounds the aperture 4. When the film cassette 5 has been inserted the gasket 3 seals the film plane against an access of light, as is apparent from FIG. 4. The gasket 3 is contained in a peripheral groove formed in the horizontal partition 2. Centering cams 6 are provided inwardly of the gasket 3 and serve to align the cassette so that the engagement of the film perforations with the transport sprocket 7 is ensured. A nose may also be provided, which prevents an insertion of the film cassette in an inverted orientation. The housing 1 is integrally combined with a laterally disposed frame counter 8, which comprises digit wheels 9, 10 for more significant digit positions and a digit wheel 11 which is associated with the least significant digit position and is directly connected to the actuating knob 12. A jack plug 13 can be inserted into the housing 1 with its two-pole plug end 14 and resiliently locked at 15. Together with the contact spring 17, which is operable by pushbutton 16, and serves as a bridging contact, the plug 13 may be used as a pulse generator for controlling a remote counter.

FIG. 2 shows in section how the transport sprocket 7 having teeth 7a, which engage the perforations of the film, is connected to the shaft 18, which is integrally molded with the actuating knob 12. The shaft 18 has a profiled end portion 19, which is coupled to the transport sprocket 7. The shaft 18 is axially held in position at a groove 20 formed in the end portion 19. FIG. 2 shows also how the frame counter 8 is provided in known manner with ten-transfer wheels 21. The axle 22 for the digit wheels 9, 10, and 11, as well as the axle 23 for the two ten-transfer wheels 24, and the surrounding counter housing 26, which is open only at the reading window 25, are integral with the housing 1. The actuating knob 12 is knurled, to facilitate its actuation, and is provided with a flange 12a, which covers the counter housing 26 on the outside. The flange 12a also accommodates the digit wheel 11 for the least significant digit position or may be integrally formed with said digit wheel 11. To close the housing 1, the bottom 27 is snapped into position in such a manner that the space around the transport sprocket 7 is lighttightly covered by 29 of the ribs 28 and 29 disposed at opposite ends of the transport sprocket 7. The rib 29 engages the annular groove 20 of the shaft 18 to hold the latter axially in position. The snapped-in bottom 27 constitutes also a surrounding guide for the push button 16 and guides a winding core-locking member 30 as it is inserted.

FIG. 3 is a longitudinal sectional view showing how the pushbutton 16 is disposed in the housing 1 and is covered by the bottom 27. The latter has an opening 32, in which a commercially available flexible wire release 31 can be inserted so that the latter is held in position by a holder 33 provided in the housing 1 and by a centering socket 34 formed in the inner end of the pushbutton 16.

FIG. 4 is a longitudinal sectional view showing the single-frame stepping mechanism. The latter comprises a stepping pawl 36, which is pivotally movable about its pivot 35 by the actuation of the pushbutton 16 and has a ramp 37, which during the actuation of the pushbutton 16 is engaged by the depressing edge 16a of the pushbutton 16 and in response thereto advances the counter. As the pushbutton 16 returns, a lifting edge 16b thereof engages another ramp 38 of the pawl 36 so that the latter is turned back to a position in which the stepping wheel 7b can be rotated in both senses. The stepping wheel 7b is integral with the transport sprocket 7. FIG. 4 shows also detent means 39, 40, which are provided at several points and releasably retain the bottom 27 in position.

FIG. 5 shows a winding core-locking member 30, which serves to lock the super 8 cassette when the latter has been inserted into the camera. The locking member 30 consists of a sheet metal angle and is inserted between the camera and the cassette adjacent to the winding core so that the core-driving member of the camera cannot engage the winding core. The locking member 30 is formed with embossed noses 30a, which prevent an unintended rotation of the winding core when the locking member has been inserted.

What is claimed is:

1. A frame-counting device for use with a film cassette, during titling and lap dissolve operations, prior to loading of the cassette into a motion picture camera and following the unloading thereof from the camera,
   the film cassette being of the type containing an unexposed film provided with a series of perforations, and having a side wall formed with an opening which defines a film plane and through which the film is exposed, said device comprising
   a housing having an aperture adapted to receive a cassette with the side wall thereof ahead,
   a transport sprocket rotatably mounted in said housing and engageable with the perforations of an unexposed film of a film cassette received in said aperture,
   means for shielding the film plane of the cassette, said shielding means comprising a gasket received in said aperture of said housing, against an access of light,
   a counter which is carried by said housing and readable from the outside and operatively connected to said transport sprocket in said housing so as to facilitate in exact counting of frames of the unexposed film,
   an actuating knob mounted in said housing, accessible from the outside, and operatively connected to said counter and said transport sprocket to operate the same, and
   a single frame stepping mechanism comprising a stepping wheel operatively connected to said counter and said transport sprocket, and a manually operable pushbutton operatively connected to said stepping wheel so as to indirectly advance said counter.

2. A frame-counting device as set forth in claim 1, in which said device is used with a motion picture camera, for operating the camera for single exposures, and said single frame mechanism further comprises
   a flexible wire release inserted into said housing adjacent to said pushbutton, and
   means for connecting said flexible wire release inside said housing and adjacent said pushbutton,
   said flexible wire release operable by said pushbutton to operate a camera for single exposures.

3. A frame-counting device as set forth in claim 2, in which
   said single-frame stepping mechanism tends to assume a position of rest in which it engages said stepping wheel so as to permit the same to be forcibly rotated in either sense of rotation, and
   said single-frame stepping mechanism is arranged to step and subsequently lock said stepping wheel in response to a depression of said pushbutton.

4. A frame-counting device as set forth in claim 3, in which said single-frame stepping device is arranged to increase the count of said counter in response to the actuation of said pushbutton.

5. A frame-counting device as set forth in claim 2, in which the connecting means comprise a holder for holding a respective end of said flexible wire release inside said housing and said pushbutton being provided with a centering socket formed in the inner end of said pushbutton, said respective end of said flexible wire release being held in a flexed position between said centering socket and said holder.

6. A frame-counting device as set forth in claim 2, in which said single-frame stepping mechanism further comprises a stepping pawl pivotally movable about a pivot point by said pushbutton, and provided with a pair of ramps, and said pushbutton having a depressing edge and a lifting edge, such that during actuation of said pushbutton, said depressing edge engages a respective one of said pair of ramps, causing said pawl to advance said counter, and as said pushbutton returns to its position of rest, said lifting edge engages another respective one of said pair of ramps, causing said pawl to be turned back to a position in which said stepping wheel can be rotated in both senses.

7. A frame-counting device as set forth in claim 1, which is designed for use with Super 8 motion picture film cassettes.

8. A frame-counting device as set forth in claim 1, in which said housing consists of plastic material.

9. A frame-counting device as set forth in claim 1, which comprises
   a detachably fitted jack plug adapted to be connected to a remote counter and
   a movable contact, which is engageable with said plug in response to the operation of said pushbutton.

10. A frame-counting device as set forth in claim 9, in which said movable contact constitutes a bridging contact.

11. A frame-counting device as set forth in claim 1, in which
   said transport sprocket and said stepping wheel are integral with each other, and
   a profiled shaft is non-rotatably connected to said transport sprocket and said stepping wheel, said shaft being formed integrally with said actuating knob.

12. A frame-counting device as set forth in claim 11, in which
   said counter comprises a plurality of digit wheels associated with different digit positions and
   the digit wheel associated with the least significant digit position is integral with the actuating knob.

13. A frame-counting device as set forth in claim 11, in which
   said counter comprises digit wheels and ten-transfer wheels and
   said profiled shaft, digit wheels and ten-transfer wheels are rotatably mounted in said partition.

14. A frame-counting device as set forth in claim 1, in which said pushbutton is adapted to be returned to a position of rest by a flexible wire release received in said housing and disposed adjacent to said pushbutton.

15. A frame-counting device as set forth in claim 1, in which said shielding means surround said aperture.

16. A frame-counting device as set forth in claim 15, in which
    a partition is disposed in said housing and constitutes the bottom of a recess adapted to receive part of said cassette,
    said partition is formed with said aperture and on the side facing said recess is formed with an annular groove surrounding said aperture, and
    said gasket fitted in and protruding from said groove.

17. A frame-counting device as set forth in claim 16, in which said partition carries centering cams disposed on the side facing said recess and adapted to locate said cassette in a position in which said perforations are aligned with said sprocket wheel.

18. A frame-counting device as set forth in claim 1, in which said housing comprises
    a body, which is formed with said aperture and has a bottom on the side of said transport sprocket opposite to said aperture, and
    a snap-fitted bottom closing said bottom opening and light-tightly shielding said aperture.

19. A frame-counting device, as set forth in claim 18, in which
    said transport sprocket and said stepping wheel are integral with each other,
    a profiled shaft which is integrally formed with said actuating knob is non-rotatably connected to said transport sprocket, and said stepping wheel, and shaft being formed with a peripheral groove, and
    said bottom of said body engages said shaft in said peripheral groove to hold said shaft axially in position.

* * * * *